May 30, 1944.  F. URBACH  2,349,999
COMBINED PRINTING AND VIEWING ARRANGEMENT
Filed May 15, 1941

INVENTOR:
Franz Urbach
BY
his agent

Patented May 30, 1944

2,349,999

UNITED STATES PATENT OFFICE 2,349,999

COMBINED PRINTING AND VIEWING ARRANGEMENT

Franz Urbach, Rochester, N. Y.

Application May 15, 1941, Serial No. 393,502

20 Claims. (Cl. 95—75)

This invention relates to an arrangement for making photographic prints from photographic negatives on light-sensitive positive material and viewing these prints.

It is an object of my invention to make a positive print from a photographic negative and to observe this print without interrupting the printing process, i. e., without removing the print from the printing support, thereby enabling continuation of the printing process after observation, if required.

It is another object of my invention to enable observation of the print during printing, i. e., during the actual appearance of the image on the light-sensitive material.

Still a further object of my present invention consists in using this arrangement for controlling photographic negatives by making positive prints quickly and easily, and observing the same.

Another object of the present invention is to simplify and to facilitate the selection of one or the other negative out of a series of negatives, e. g., a series of aerial or portrait photographs.

Still another object of my invention consists in using this arrangement and the new process proposed by me for determining the time of exposure needed for printing or enlarging of negatives.

With the above objects in view, my present invention mainly consists in a process of making a positive print from a photographic negative on a light-sensitive material and viewing said print, comprising the steps of making a print from a negative on a light-sensitive material, on which the print becomes visible during printing, by means of a printing light source emitting light rays to which this light-sensitive material is sensitive, illuminating this light-sensitive material by means of viewing light rays to which this light-sensitive material is insensitive, excluding from the observation point all light rays emitted by the printing light source and by other light sources, and viewing the print on the light-sensitive material illuminated by the viewing light rays only.

The arrangement used for this process comprises in combination a frame for holding the photographic negative during printing, a support for holding the light-sensitive material during printing, a printing light source emitting light rays to which the light-sensitive materials is sensitive, and a viewing light source emitting only light rays to which the light-sensitive material is substantially insensitive, said viewing light source arranged in such a manner as to be adapted to illuminate the light-sensitive photographic material, while the same is held by said support.

As pointed out above, it is essential to use a light-sensitive material on which the print becomes visible during printing. Such light-sensitive photographic material is well known for other purposes: thus, for instance, it is known to use the so-called printing-out film or paper for daylight printing. This material can be used for my purposes, too; it is, however, important to use a highly light-sensitive kind of the same. Printing-out paper or film is adapted to be used only once, as the print cannot be removed from the light-sensitive material.

If the light-sensitive material, i. e., the light-sensitive paper or film has to be used for controlling purposes only, it is advantageous to use a material, the light-sensitive layer of which is made by a reversible photo-chemical process, i. e., to use a material on which the print automatically disappears after printing, when placed in the dark or illuminated with rays of other wavelengths than those used for printing. In this case, the light-sensitive layer may consist, for instance, of a mercury iodide emulsion, or it may contain organic dyes as thionine, or may also contain so-called phototrop substances as triphenylfulgide or chemically sensibilized halogene silver hydrosol exempt from protective colloids.

Instead of the above described photo-chemically acting systems, I also may use thermo-chemically sensitive systems which use thermoscopic or thermodrom substances as, for instance, mercury iodide ($HgI_2$) or $Ag_2HgI_4$ or $Cu_2HgI_4$; these substances show, in case of change in temperature, a change in color; thus, it is possible to have the printing light act by its heat and influence the heat sensitive emulsion of the printing material in accordance with the transparency of the printed negative.

In principle, it is also possible to use photographic material of the usual type if it can be developed in a very short time, i. e., if its development takes no longer than the time needed for exposure.

When using one of the types of the light-sensitive materials described above, it is possible to observe and to view the print either during appearance, i. e. formation, or to interrupt the printing process and observe the print during this interruption period.

When using reversible light-sensitive materials, i. e., material on which the prints, if not treated after exposure in a special way, are disappearing again, it is possible to regulate the transparency of the print by letting it partly disappear again.

In all cases, however, it is important to build the photographic arrangement proposed by me in such a manner that no light rays emitted by the printing light source are to reach, directly or indirectly, the observer's eye viewing the print.

This can be attained either by providing movable means for screening the light-sensitive photographic material from the printing light when required, or by providing switching means for switching the printing light on or off; then, the print can be observed when it is screened from the printing light or the printing light source is switched off.

In accordance with another embodiment of my invention, I propose to use for printing purposes a printing light source emitting only light rays to which the light-sensitive photographic material is sensitive, for illuminating the light-sensitive material a viewing light source emitting only light rays to which this material is substantially insensitive, and to arrange between the observation point and the light-sensitive material a filter adapted to absorb all, or most, of the light rays emitted by the printing light source. By this arrangement it is possible to illuminate the light-sensitive photographic material by the viewing light source and to observe it during the printing process.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawing, in which:

Figure 1:
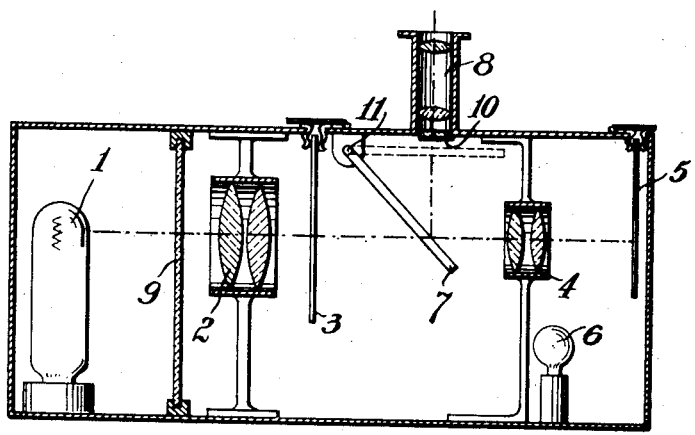
Fig. 1 is a schematic view of an arrangement according to the present invention, with tiltable mirror.

In the embodiment shown in Fig. 1, the light rays emitted by the printing light source 1 pass through condenser 2, negative 3, the projection lens 4, and impinge unto the light-sensitive material 5, on which the print of negative 3 becomes visible during printing. This arrangement is identical with the photographic arrangements used for enlarging purposes or the like. For observation, I provide the viewing light source 6 emitting only light rays to which the light-sensitive photographic material is insensitive. Furthermore, I provide an optical system, e. g., the reflecting mirror 7 and the telescope 8 for observing the print forming or formed on the light-sensitive material 5. As mirror 7 is arranged tiltably about axis 11, it can be tilted into and out of the path of the printing light rays. For observation purposes it may be tilted into the path of the light rays, thus interrupting the printing process and enabling the observation of the print illuminated by the viewing light source 6. During printing, this mirror 7 is tilted into inoperative position, outside of the path of the printing light rays.

When using a semi-transparent mirror, the same may remain constantly in operative position in the path of the printing light rays. In order to avoid double reflection of the printed image by the front and rear face of this semi-transparent mirror, it is advisable to coat the front face of the mirror with the light reflecting substance and to make the mirror itself of a material which acts as a filter for the light rays emitted by the printing light source; thus it is possible to avoid visible reflection by the rear face of the mirror.

Figure 2:
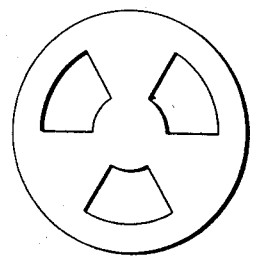
Fig. 2 is a plane view of a rotating disk adapted to be used in combination with the arrangement shown in Fig. 1.

I may also use a rotating mirror with cut-outs, rotating in a plane normal to the direction of the light rays, as shown in Fig. 2, instead of the tiltable mirror 7. In this case, it is possible to observe the print during printing without interruption of the printing process.

It is also possible to provide a semi-transparent mirror and simultaneously to make the print and observe it during its appearance on the light-sensitive material.

In both latter cases, however, it is necessary to limit the region of the spectrum of the printing light rays reaching mirror 7, and to prevent these printing light rays from reaching the optical viewing system, i. e. the telescope 8. In order to attain this purpose, I insert in front of the printing light source 1 a filter 9 which transmits only light rays to which the light-sensitive photographic material 5 is sensitive. On the other hand, I provide in front of telescope 8 a filter 10 which absorbs all light rays having been transmitted by filter 9. Thus, the observer is enabled to view photographic material 5 as if it were illuminated by the viewing light source 6 only, independently from the printing light source 1.

Figure 3:
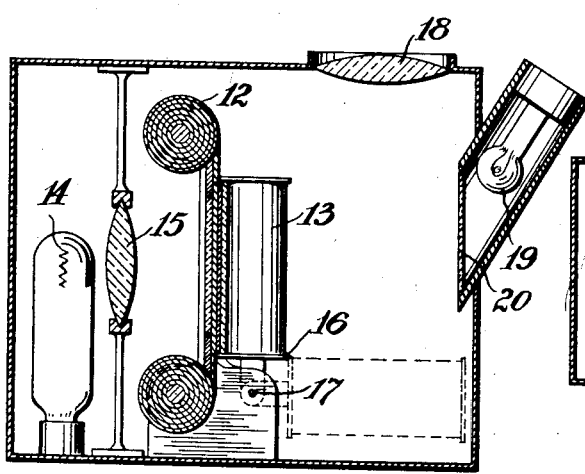
Fig. 3 is a longitudinal cross-section of another embodiment of my invention adapted to be used with a negative and a positive film strip.

In the embodiment, shown in Fig. 3, the prints are made by superimposing a photographic negative film 12 and a light-sensitive positive film 13, and exposing the latter by the action of the printing light emitted by the light source 14. In front of light source 14, condenser 15 is arranged. In accordance with my present invention, the film rolls 16 carrying the light-sensitive film or paper 13 during exposure and observation, are tiltable about axis 17, thus being adapted to be tilted from printing position, shown in full lines, into viewing position, shown in dotted lines, and back. When moved into horizontal viewing position, i. e. into the position shown in dotted lines, the front face of the light-sensitive film 13 faces viewing lens 18; the viewing light source 19 is arranged in such a manner as to illuminate film 13 when the same is in horizontal viewing position. In order to avoid exposure of the light-sensitive layer of the film by light source 19, a red filter 20 is arranged in front of light source 19. After switching off the printing light source 14, the print on film 13 can be observed by aid of the viewing light source 19 and the red filter 20. An additional red filter may also be provided to hinder the light from the surroundings of the apparatus to affect the light-sensitive material.

Figure 4:
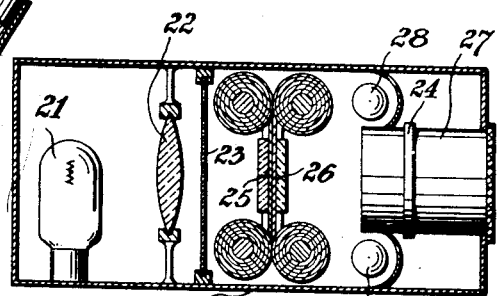
Figs. 4 and 5 are schematic longitudinal views of two other embodiments of my invention, adapted for observation of the rear face of the positive film.

The embodiment shown in Fig. 4, is adapted to be used with a transparent, or translucent, light-sensitive material 26, e. g., a film consisting of a thin emulsion on a transparent film base. Printing light source 21, condenser 22, blue filter 23, and negative 25 are arranged substantially in the same manner as shown in the embodiment in Fig. 1. The light-sensitive transparent film 26, unto which the image is to be printed, is superimposed on negative 25. An optical viewing device 27 and red filter 24 are arranged behind film 26, enabling observation of the rear face of this film. Light sources 28 emitting light rays to which film 26 is insensitive, for instance, emitting red light, are arranged adjacent to the optical viewing device 27 illuminating the rear face of film 26. By this arrangement it is possible to observe the print through viewing device 27 and red filter 24, undisturbed by the printing light source 21.

Figure 5:
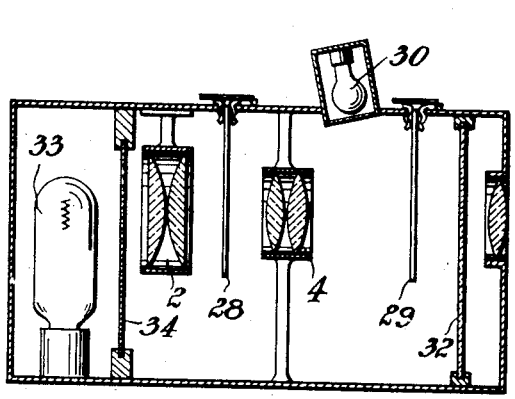

The arrangement shown in Fig. 5 is very similar to the one shown in Fig. 4; the main difference is that the arrangement shown in Fig. 4 is adapted for making a print on a light-sensitive film which is superimposed on the negative, while the arrangement shown in Fig. 5 is adapted for printing by projection, e. g. for enlarging purposes. In accordance with the different purposes of the arrangements, their constructions differ: while in the arrangement shown in Fig. 4 the negative 25 and the positive 26 are superimposed, in the arrangement shown in Fig. 5 negative 28 and light-sensitive film 29 are at a certain distance from each other.

Furthermore, in this latter embodiment, the viewing light source, i. e., the red lamp 30 is arranged in such a manner as to illuminate the front face of the light-sensitive film 29. The print appearing on the light-sensitive film 29 is observed by means of the optical system 31 and the filter 32 arranged in front of this optical system and transmitting the red light rays emitted by the red lamp 30 only. In front of the printing light source 33, an additional filter 34 is arranged which transmits only light rays to which the positive film 29 is sensitive. By this arrangement it is possible to make a print by means of the printing light source 33 and to observe this print during its appearance by means of the viewing light source 30 and optical system 31. Filters 32 and 34 serve the purpose to exclude from the observer's eye all printing light rays, thereby enabling observation of the print during its formation, independently of the printing process.

In this arrangement, the viewing light source and the observation point are on opposite sides of the light sensitive material. I wish to stress that, in this case, it is advantageous that the angle between the illuminating light rays emitted by the viewing light source 30 and the light-sensitive film 29 be an acute angle of preferably less than 30 degrees. I have found that by providing such an oblique angle between illuminating light rays and film, the illumination of the print is yielding a more contrasty impression.

Figure 6:
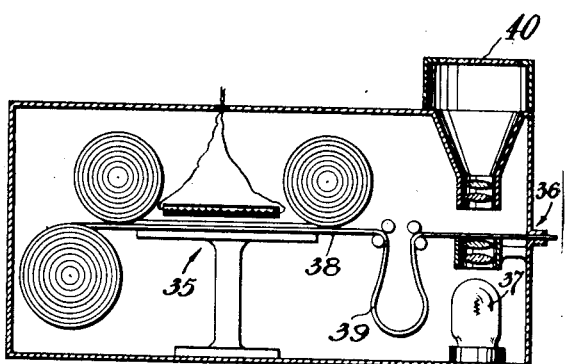
Fig. 6 is a schematic view of a photographic arrangement for cinematographic films.

In the embodiment shown in Fig. 6, my invention is used for observing cinematographic films during printing. A continuous printing device 35, of the usual type, is combined with a viewing device 36, provided with a translucent screen, e. g. ground glass 40, unto which the printed pictures are projected; this viewing device is equipped with a light source 37, emitting light rays to which the positive film 38 is insensitive. A film transporting device, not shown in the drawing, is arranged for intermittent transport of film 38 through the viewing device. A film loop 39 is provided between the printer 35 and the viewing device 36 in order to enable intermittent motion of the film in the viewing device. It is evident that the viewing device has to be screened from the printing light.

I want to emphasize that, from the point of view of my present invention, it is very important that the color of the viewing light be substantially complementary to the color of the picture, if the latter has any color. In this case, the picture appears especially clearly through the optical viewing system.

If the picture has a distinct color, the contrast may be controlled by using different color filters in front of the viewing light source and/or between the picture and the observation point.

It should be noted that besides the means for observing the light-sensitive positive material, I may also provide means for observing the negative itself; this offers the possibility visually to compare the transparency of the negative with the print appearing on the light-sensitive positive material.

As stated above, my new arrangement can be used for determining the time of the exposure needed for printing or enlarging. In this case, it is important and advantageous to combine with this printing arrangement an indicating device adapted to indicate the exposure time. This indicating device is to be connected with the printing arrangement in such a manner as to be adapted to indicate the whole exposure time up to the moment in which the person making the prints finds the negative to have been exposed long enough. In order to attain correct indication, the indicating device starts to indicate at the same time at which the printing light begins to act upon the negative; its indicating movement is stopped during each interruption of the printing process and is started again when the printing process is continued. This indicating device may be provided with means permitting the operating person to stop the movement of the time indicating device while continuing the exposure; this stopping of the time indicating device may be advantageous for certain testing purposes.

It will be understood that each of the elements described above, or two or more together, may also find a useful application in other types of printing arrangements differing from the types described above.

While I have illustrated and described the invention as embodied in photographic arrangements, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalency of the following claims.

What I claim as new and desire to secure by Letters Patent is:

1. Arrangement for making a positive print from a photographic negative on a light-sensitive positive material and viewing said print, comprising in combination means for holding said photographic negative during printing, a support for holding said light-sensitive positive material during printing, a printing light source emitting light rays to which said light-sensitive positive material is sensitive, a viewing light source emitting only light rays to which said light-sensitive positive material is substantially insensitive, said viewing light source arranged in such a manner as to be adapted to illuminate said light-sensitive positive material, while the same is held by said holding means, viewing means for observation of said light-sensitive material while the same is held by said holding means, and means adapted to prevent light rays emitted by said printing light source to reach directly or indirectly the observer's eye when he observes through said viewing means the light sensitive material held by said holding means.

2. Photographic arrangement for making a positive print from a photographic negative on a light-sensitive positive material and viewing said print, comprising in combination means for holding said photographic negative during printing, a support for holding said light-sensitive positive material during printing, a printing light source emitting light rays to which said light-sensitive positive material is sensitive, movable means for screening said light-sensitive positive material from said printing light source when required, a viewing light source emitting only light rays to which said light-sensitive positive material is substantially insensitive, said viewing light source arranged in such a manner as to be adapted to illuminate said light-sensitive positive material, while the same is held by said holding means, thus permitting viewing of the print when the same is screened from the printing light, and viewing means for observation of said light-sensitive material while the same is held by said holding means, said viewing means arranged so as to enable said observation while said light-sensitive material is screened from said printing light source by said movable screening means.

3. Arrangement for making a positive print from a photographic negative on a light-sensitive positive material and viewing said print, comprising in combination means for holding said photographic negative during printing, a support for holding said light-sensitive positive material during printing, a printing light source emitting light rays to which said light-sensitive positive material is sensitive, switching means for switching said printing light on and off, a vewing light source emitting only light rays to which said light-sensitive positive material is substantially insensitive, said viewing light source arranged in such a manner as to be adapted to illuminate said light-sensitive positive material, while the same is held by said holding means, thus permitting viewing of the print when the printing light is switched off and viewing means for observation of said light-sensitive material while the same is held by said holding means.

4. Arrangement for making a positive print from a photographic negative on a light-sensitive positive material and viewing said print, comprising in combination means for holding said photographic negative during printing, a support for holding said light-sensitive positive material during printing at a certain distance parallel to said photographic negative, a printing light source emitting only light rays to which said light-sensitive positive material is sensitive, a viewing light source emitting only light rays to which said light-sensitive positive material is substantially insensitive, said viewing light source arranged in such a manner as to be adapted to illuminate one face of said light-sensitive positive material, while the same is held by said holding means, viewing means for observation of said light-sensitive material while the same is held by said holding means, and means adapted to prevent light rays emitted by said printing light source to reach directly or indirectly the observer's eye when he observes through said viewing means the light-sensitive material held by said holding means.

5. In an arrangement of the character claimed in claim 4, a viewing light source arranged in such a manner that it illuminates the same face of the light-sensitive positive material as does the printing light source.

6. In an arrangement of the character claimed in claim 4, a viewing light source arranged in such a manner that it illuminates the same face of the light-sensitive positive material as does the printing light source, and a filter, absorbing light rays to which said light-sensitive positive material is sensitive, not absorbing, however, the light rays emitted by said viewing light source, said filter arranged between the observation point from which said light-sensitive positive material is viewed and the support holding said light-sensitive positive material, in the path of the illuminating light rays reflected by said light-sensitive positive material, thus permitting continuous observation of the print on said light-sensitive material during printing.

7. In an arrangement of the character claimed in claim 4, a viewing light source arranged in such a manner that it illuminates the same face of the light-sensitive positive material as does the printing light source, and a removable mirror adapted to be moved into operative position in the path of the printing light rays between the photographic negative and the light-sensitive positive material in such a manner that it prevents said printing light rays from reaching the light-sensitive positive material and simultaneously reflects the illuminating light rays reflected by said light-sensitive positive material into an observation point, thus permitting viewing of the print on said light-sensitive positive material when said mirror is moved into operative position.

8. Arrangement for making a positive print from a photographic negative on a light-sensitive layer on a transparent material, and viewing said print, comprising in combination means for holding said photographic negative during printing, a support for holding said light-sensitive transparent material during printing, a printing light source emitting light rays to which said light-sensitive transparent material is sensitive, said printing light source arranged in such a manner that said emitted printing light rays are impinging on the front face of said light-sensitive transparent material, a viewing light source emitting only light rays to which said light-sensitive transparent material is insensitive, said viewing light source arranged in such a manner as to illuminate the rear face of said light-sensitive transparent material while the same is held by said holding means and optical viewing means for observing the rear face of said light-sensitive transparent material when illuminated by said viewing light source.

9. Arrangement for making a positive print from a photographic negative on a light-sensitive layer on a transparent material, and viewing said print, comprising in combination means for holding said photographic negative during printing, a support for holding said light-sensitive transparent material during printing, a printing light source emitting light rays to which said light-sensitive transparent material is sensitive, said printing light source arranged in such a manner that said emitted printing light rays are impinging on the front face of said light-sensitive transparent material, a viewing light source emitting only light rays to which said light-sensitive transparent material is insensitive, said viewing light source arranged in such a manner as to illuminate one face of said light-sensitive transparent material while the same is held by said holding means, and optical viewing means for observing simultaneously the other face of said light-sensitive transparent material.

10. Arrangement for making photographic print from a photographic negative on a light-sensitive positive material and viewing said print, comprising in combination a printing light source emitting light rays to which said light-sensitive positive material is sensitive, a viewing light source emitting only light rays to which said light-sensitive positive material is insensitive, a stationary frame for holding said photographic negative during printing, a movable support arranged in such a manner as to be adapted to move said light-sensitive positive material from the path of the printing light rays emitted by said printing light source into the path of the illuminating light rays emitted by said viewing light source, and back and viewing means for observation of said light-sensitive material arranged in such a manner as to enable observation of said material while the same is moved by said movable support into the path of the illuminating light rays emitted by said viewing light source.

11. Arrangement for making a positive print from a photographic negative on a light-sensitive positive material and viewing said print, comprising in combination a printing light source emitting light rays to which said light-sensitive positive material is sensitive, a viewing light source emitting only light rays to which said light-sensitive positive material is insensitive, a stationary frame for holding said photographic negative during printing, a tiltable support arranged in such a manner as to be adapted to tilt said light-sensitive positive material from the path of the printing light rays emitted by said printing light source into the path of the illuminating light rays emitted by said viewing light source, and back and viewing means for observation of said light-sensitive material, said viewing means arranged in such a manner as to enable observation of said material when the same is tilted by said tiltable support into the path of the illuminating light rays emitted by said viewing light source.

12. Arrangement for making a positive print from a photographic negative on a light-sensitive film, and viewing said print, said arrangement comprising in combination a printing light source emitting light rays to which said light-sensitive film is sensitive, a viewing light source emitting only light rays to which said light-sensitive film is substantially insensitive, a combined frame for holding said photographic negative and said light-sensitive film superimposed during printing, said frame being built and arranged in such a manner that the frame part holding the light-sensitive film is tiltable into the path of the illuminating light rays emitted by said viewing light source and viewing means for observation of said light-sensitive film, said viewing means arranged in such a maner as to enable observation of said film when the same is tilted by the frame part holding it into the path of the illuminating light rays emitted by said viewing light source.

13. In the arrangement claimed in claim 12, a combined frame holding the light-sensitive film in such a manner that a portion of said film remains in contact and register with the superimposed negative also during tilting of the main portion of said film into the path of the illuminating light rays emitted by said viewing light source.

14. Arrangement for making a positive print from a negative on a light-sensitive film and viewing said print, said arrangement comprising in combination a printing light source emitting light rays to which said light-sensitive film is sensitive, a viewing light source emitting only light rays to which said light-sensitive film is substantially insensitive, a combined frame for holding said negative film and said light-sensitive film superimposed during printing, said frame being built and arranged in such a manner that the frame-part holding the light-sensitive film is tiltable into the path of the illuminating light rays emitted by said viewing light source and viewing means for observation of said light-sensitive film, said viewing means arranged in such a manner as to enable observation of said film when the same is tilted by the frame part holding it into the path of the illuminating light rays emitted by said viewing light source.

15. Arrangement for making a positive print from a cinematographic negative film on a light-sensitive positive film and viewing said print, said arrangement comprising in combination a continuous printing device for making said print from said cinematographic film on said light-sensitive positive film, a viewing device for viewing said light-sensitive positive film after printing, said viewing device equpped with a viewing light source emitting only light rays to which said light-sensitive positive film is insensitive, and means for intermittent transport of said light-sensitive positive film through said viewing device.

16. Process of making a positive photographic print from a photographic negative on a light-sensitive photographic material and viewing said print, comprising the steps of making a print from a negative on a light-sensitive photographic material, on which the print becomes visible during printing, by means of printing light rays to which said light-sensitive photographic material is sensitive, illuminating said light-sensitive photographic material by means of viewing light rays to which said light-sensitive photographic material is insensitive, excluding from the observation point all visible printing light rays and viewing said print on said light sensitive photographic material by means of said viewing light rays during the progress of the printing process.

17. Arrangement for making a positive print from a photographic negative on a light-sensitive positive material and viewing said print, comprising in combination means for holding said photographic negative during printing, means for holding said light-sensitive positive material during printing in contact with said photographic negative, a printing light source emitting light rays to which said light-sensitive positive material is sensitive, a viewing light source emitting only light rays to which said light-sensitive positive material is substantially insensitive, said viewing light source arranged in such a manner as to be adapted to illuminate said light-sensitive positive material, while the same is held by said holding means, viewing means for observation of said light-sensitive material while it is held by said holding means, and means adapted to prevent light rays emitted by said printing light source to reach directly or indirectly the observer's eye when he observes through said viewing means the light sensitive material held by said holding means.

18. Arrangement for making a positive print from a photographic negative on a light-sensitive layer on a transparent material, and viewing said print, comprising in combination means for holding said photographic negative during printing, means for holding said light-sensitive transparent material during printing in contact with said photographic negative, a printing light source emitting light rays to which said light-sensitive transparent material is sensitive, said printing light source arranged in such a manner that said emitted printing light rays are impinging on the front face of said light-sensitive transparent material, a viewing light source emitting only light rays to which said light-sensitive transparent material is insensitive, said viewing light source arranged in such a manner as to illuminate the rear face of said light-sensitive transparent material while the same is held by said holding means and viewing means for observation of the rear face of said light-sensitive transparent material while the same is held by said holding means and illuminated by said viewing light source.

19. Arrangement for making a photographic print from a photographic negative on a light-sensitive positive material and viewing said print, comprising in combination a printing light source emitting light rays to which said light-sensitive positive material is sensitive, a viewing light source emitting only light rays to which said light-sensitive positive material is insensitive, a stationary frame for holding said photographic negative during printing, a movable support arranged in such a manner as to be adapted to hold said light sensitive material in contact with said photographic negative and to move this positive material from its position in contact with said photographic negative and in the path of the printing light rays emitted by the printing light source, into a position in the path of the illuminating light rays emitted by said viewing light source, and back and viewing means for observation of said light-sensitive material when the same is moved by said support into the path of the illuminating light rays emitted by said viewing light source.

20. Arrangement for making a positive print from a photographic negative on a light-sensitive positive material and viewing said print, comprising in combination means for holding said photographic negative during printing, a support for holding said light-sensitive positive material during printing, a printing light source emitting light rays to which said light-sensitive positive material is sensitive, and a viewing light source emitting only rays to which said positive photographic material is substantially insensitive, said viewing light source arranged in such a manner as to be adapted to illuminate said light-sensitive positive material, while the same is held by said holding means, a device for indicating the time during which said light-sensitive positive material is exposed to the light rays of the printing light source, and means automatically stopping the movement of said indicating device during the time that the exposure of the light-sensitive positive material is interrupted.

FRANZ URBACH.